United States Patent
Watanabe et al.

(10) Patent No.: US 10,821,924 B2
(45) Date of Patent: Nov. 3, 2020

(54) VEHICLE POWER SUPPLY CIRCUIT

(71) Applicant: Yazaki Corporation, Tokyo (JP)

(72) Inventors: Jin Watanabe, Makinohara (JP); Tooru Takahashi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/585,225

(22) Filed: Sep. 27, 2019

(65) Prior Publication Data
US 2020/0122658 A1 Apr. 23, 2020

(30) Foreign Application Priority Data
Oct. 23, 2018 (JP) .................................. 2018-199367

(51) Int. Cl.
*B60R 16/03* (2006.01)
*H01H 47/22* (2006.01)

(52) U.S. Cl.
CPC ............. *B60R 16/03* (2013.01); *H01H 47/22* (2013.01)

(58) Field of Classification Search
CPC ......... B60R 16/03; H05B 47/00; H01H 47/22
See application file for complete search history.

(56) References Cited

U.S. PATENT DOCUMENTS

| | | | |
|---|---|---|---|
| 2002/0109949 A1* | 8/2002 | Ueno ..................... | B60R 16/03 361/2 |
| 2012/0162846 A1* | 6/2012 | Ohshima ................ | H01H 47/10 361/160 |
| 2019/0016229 A1* | 1/2019 | Sato ....................... | B60L 58/14 |
| 2020/0094758 A1* | 3/2020 | Kawakami ............. | B60R 16/03 |
| 2020/0119539 A1* | 4/2020 | Watanabe .............. | B60R 16/03 |

FOREIGN PATENT DOCUMENTS

JP 2005-29020 A 2/2005

* cited by examiner

*Primary Examiner* — Jared Fureman
*Assistant Examiner* — Duc M Pham
(74) *Attorney, Agent, or Firm* — Sughrue Mion, PLLC

(57) ABSTRACT

A vehicle power supply circuit includes; a plurality of switch circuits which are connected in parallel to each other and connected to a power supply at positive electrode side to be switched to an open or short circuit separately; a relay circuit including an excitation coil and a switch unit which is connected to the power supply at positive electrode side and is switched from an open circuit to a short circuit since a current flows from the power supply to the excitation coil; and a resistor disposed in parallel with the excitation coil and connected in series to the plurality of switch circuits.

6 Claims, 5 Drawing Sheets

VEHICLE POWER SUPPLY CIRCUIT

CROSS REFERENCE TO RELATED APPLICATIONS

This application is based on and claims priority from Japanese patent application No. 2018-199367 filed on Oct. 23, 2018, the entire contents of which are incorporated herein by reference.

BACKGROUND OF THE INVENTION

1. Technical Field

The present invention relates to a vehicle power supply circuit which is mounted on a vehicle such as an automobile and includes a switch circuit connected to a power supply and switched to an open or short circuit.

2. Background Art

A vehicle power supply circuit is mounted on a vehicle such as an automobile in order to supply electric power from a predetermined power supply to, for example, a lamp device which is an electrical load (see, Patent Literature JP-A-2005-029020). For example, when a transmission of the vehicle is switched to a back gear in order to reverse the vehicle, a switch circuit of the vehicle power supply circuit is short-circuited along with the switching, and a back lamp of a lamp device is turned on.

SUMMARY

A current (an electric current) specification of the switch circuit differs with a type of the transmission of the vehicle, and the vehicle power supply circuit is prepared in various manners depending on a type of the switch circuit. That is, in the vehicle power supply circuit, circuit structures and constituent elements different in various manners are provided depending on differences in the current specification of the switch circuit.

Here, two types of vehicle power supply circuits 30 and 40 including switch circuits 31 and 41 having mutually different specifications are described as related examples thereof with reference to FIG. 4 and FIG. 5, respectively. FIG. 4 is a circuit schematic diagram illustrating the vehicle power supply circuit 30 in a case of a continuously variable transmission (CVT). FIG. 5 is a circuit schematic diagram illustrating the vehicle power supply circuit 40 in a case of a manual transmission (MT).

The vehicle power supply circuits 30 and 40 of the first and second related examples described here are provided in mutually different specifications depending on differences in the type of the transmission. The vehicle power supply circuits 30 and 40 are used to turn on back lamps L1 and L2 when the transmission is switched to the back gear. Specifically, the vehicle power supply circuit 30 according to a first related example is a circuit for turning on the back lamps L1 and L2 in the case of the continuously variable transmission. The vehicle power supply circuit 40 according to a second related example is a circuit for turning on the back lamps L1 and L2 in the case of the manual transmission.

First, the vehicle power supply circuit 30 according to the first related example is described with reference to FIG. 4. As shown in FIG. 4, the vehicle power supply circuit 30 for turning on the back lamps L1 and L2 according to the first related example includes a power supply B provided by grounding, and a switch circuit 31 switched to an open or short circuit, a relay circuit 32 having an excitation coil 33 and a switch unit 34, and back lamps (lamp devices) L1 and L2 supplied with electric power from a power supply as an electrical load. A fuse circuit F which protects a circuit from an overcurrent is connected to the power supply B. A pair of the back lamps L1 and L2 are provided and connected in parallel to each other and grounded on a negative electrode side.

The switch circuit 31 is disposed, for example, in an engine room in front of the vehicle, and a positive electrode side of the switch circuit 31 is connected to the power supply B via the fuse circuit F. An initial state of the switch circuit 31 is set to be open. In the switch circuit 31 of the related example, a rated value of a current flowing from the power supply B to the switch circuit 31 itself is not particularly limited, and is configured to be applicable to a wide range of current values.

The excitation coil 33 of the relay circuit 32 is connected to a negative electrode side of the switch circuit 31 on a positive electrode side and grounded on a negative electrode side. The switch unit 34 of the relay circuit 32 is connected to the power supply B via the fuse circuit F on a positive electrode side, and is connected to the pair of back lamps L1 and L2 connected in parallel on a negative electrode side. In order to share components between car models, the relay circuit 32 and the fuse circuit F are provided in one unit, and one component is formed as a relay drive circuit U.

With such a configuration, when the transmission is switched to the back gear, the switch circuit 31 is switched from an open circuit to a short circuit to be turned on and energized. By the energization, a current flows to the excitation coil 33 of the relay circuit 32 to generate a magnetic field. According to the magnetic field generation, the switch unit 34 of the relay circuit 32 is switched from an open circuit to a short circuit, and a circuit is connected between the power supply B and the back lamps L1 and L2. Accordingly, electricity is supplied from the power supply B to the pair of back lamps L1 and L2, and as a result, the back lamps L1 and L2 are turned on.

Next, the vehicle power supply circuit 40 according to a second related example is described with reference to FIG. 5. The same or equivalent parts as in the first related example are denoted by the same or equivalent reference numerals in the drawings, and description thereof is omitted or simplified.

As shown in FIG. 5, the vehicle power supply circuit 40 according to the second related example includes a power supply B, a switch circuit 41, a relay circuit 32, and a pair of back lamps L1 and L2. The relay circuit 32 of the related example has the same specification as in the first related example, and is incorporated in a circuit as a common component for standardization of components. However, the excitation coil 33 of the relay circuit 32 is not connected to the circuit, and both ends of the excitation coil 33 are set to be open at all times. That is, the relay circuit 32 of the related example does not function as a circuit having the same structure but does not conduct electricity.

In the case of the manual transmission, a rated value of a current flowing from the power supply B to the switch circuit 41 itself is set in the switch circuit 41. Specifically, it is required as a specification that a current of 1 [A] or more flows to the switch circuit 41. This is because in the case of the manual transmission, it is necessary to remove an oxide film generated at a contact (not shown) of the switch circuit 41.

With such a configuration, when the transmission is switched to the back gear, the switch circuit 41 is turned on and energized. By the energization, electric power is directly supplied from the power supply B to the pair of back lamps L1 and L2. Accordingly, the pair of back lamps L1 and L2 is turned on.

As described above, the current specifications of the switch circuit are also different depending on the type of the transmission of the vehicle. On the other hand, regardless of the difference in the current specifications of the switch circuit, the vehicle power supply circuit is expected to be standardized and to have increased versatility. Even when the specifications of the switch circuit are different, if the vehicle power supply circuit can be standardized, manufacturing cost can be reduced, and work efficiency at the time of mounting on the vehicle can be improved.

The present invention has been made in view of the above circumstances, and an object thereof is to provide a vehicle power supply circuit that can increase versatility by standardizing a circuit even when the specifications of the switch circuits are different.

In order to achieve the above object, the vehicle power supply circuit according to the present invention is characterized by the following (1) to (6).

(1) A vehicle power supply circuit comprising:
a plurality of switch circuits which are connected in parallel to each other and connected to a power supply at one end to be switched to an open or short circuit separately;
a relay circuit including an excitation coil and a switch unit which is connected to the power supply at one end and is switched from an open circuit to a short circuit since a current flows from the power supply to the excitation coil;
one or more loads in which one end is connected to the other end of the switch unit and the other end is grounded, and electric power is supplied from the power supply; and
a resistor disposed in parallel with the excitation coil and connected in series to the plurality of switch circuits.

(2) The vehicle power supply circuit according to above (1), wherein
one end of the excitation coil is connected to the other end of the plurality of switch circuits separately and the other end of the excitation coil is grounded, and a current flows from the power supply through the plurality of switch circuits, and
one end of the resistor is connected to the other end of the plurality of switch circuits separately and the other end of the resistor is grounded.

(3) The vehicle power supply circuit according to above (1), wherein
one end of the excitation coil is connected to the power supply, and the other end of the excitation coil is connected to one end of the plurality of switch circuits,
one end of the resistor is connected to the power supply, and the other end of the excitation coil is connected to one end of the plurality of switch circuits, and
the one end of the plurality of switch circuits is connected to the power supply via the excitation coil and the resistor, and the other end of the plurality of switch circuits is grounded.

(4) The vehicle power supply circuit according to above (1), wherein
a rated value of a current flowing from the power supply to the switch circuit is set in at least one of the plurality of switch circuits, and
a resistance value of the resistor is set based on the rated value.

(5) The vehicle power supply circuit according to above (1), wherein
when mounted on a vehicle, only one of the plurality of switch circuits corresponding to a specification of the vehicle is set to be capable of being switched to an open or short circuit, and the rest of the plurality of switch circuits is set to be open at all times.

(6) The vehicle power supply circuit according to above (1), wherein
a plurality of the loads are provided and connected in parallel with each other.

The vehicle power supply circuit having the configuration of the above (1) includes a resistor disposed in parallel with the excitation coil and connected in series to the plurality of switch circuits. Therefore, the rated value of the current flowing from the power supply to the switch circuit itself is set in at least one of the plurality of switch circuits, and even when specifications are different between the rest switch circuits, a desired current can flow to the switch circuit in which the rated value is set by using the resistor which is a simple circuit element. Accordingly, even when the specifications of the switch circuits are different, the circuit can be standardized with a simple configuration and versatility can be improved. Therefore, the manufacturing cost of the vehicle power supply circuit can be reduced, and work efficiency at the time of vehicle mounting can be improved.

According to the vehicle power supply circuit having the configuration of the above (2), one end of the excitation coil is connected to the other end of the plurality of switch circuits separately and the other end of the excitation coil is grounded, a current flows from the power supply through the plurality of switch circuits, and one end of the resistor is connected to the other end of the plurality of switch circuits separately and the other end of the resistor is grounded. Also in this case, even when the specifications of the switch circuits are different, the circuit can be standardized, and versatility can be improved.

According to the vehicle power supply circuit having the configuration of the above (3), one end of the excitation coil is connected to the power supply, and the other end of the excitation coil is connected to one end of the plurality of switch circuits, one end of the resistor is connected to the power supply, and the other end of the excitation coil is connected to one end of the plurality of switch circuits, and the one end of the plurality of switch circuits is connected to the power supply via the excitation coil and the resistor, and the other end of the plurality of switch circuits is grounded. Also in this case, even when the specifications of the switch circuits are different, the circuit can be standardized, and versatility can be improved. Although the plurality of switch circuits are usually installed in an engine room of the vehicle, electric wires that return from the switch circuits to the vehicle body can be reduced according to the configuration. Accordingly, manufacturing cost of the vehicle power supply circuit can be reduced.

According to the vehicle power supply circuit having the configuration of the above (4), a resistance value of the resistor is preferably set based on the rated value. In this case, since the resistor having various resistance values can be obtained easily and at low cost, standardization of the circuit can be easily realized, and an increase in manufacturing cost can be prevented.

According to the vehicle power supply circuit having the configuration of the above (5), only one of the plurality of switch circuits corresponding to the specification of the vehicle is set to be capable of being switched to an open or short circuit, and the rest of the plurality of switch circuits is preferably set to be open at all times. In this case, since one of the plurality of switch circuits is selected according to the specification of the vehicle, it can be applied to various vehicle types, and versatility of the circuit can be improved.

According to the vehicle power supply circuit having the configuration of the above (6), a plurality of the loads are provided and preferably connected in parallel with each other. In this case, electric power can be simultaneously supplied from the power supply to the plurality of loads through the switch circuits.

The configuration of the vehicle power supply circuit of the present invention includes a resistor disposed in parallel with the excitation coil and connected in series to the plurality of switch circuits. Therefore, the rated value of the current flowing from the power supply to the switch circuit itself is set in at least one of the plurality of switch circuits, and even when specifications are different between the rest switch circuits, a desired current can flow to the switch circuit in which the rated value is set by using the resistor which is a simple circuit element. Accordingly, even when the specifications of the switch circuits are different, the circuit can be standardized with a simple configuration and versatility can be improved. Therefore, the manufacturing cost of the vehicle power supply circuit can be reduced, and work efficiency at the time of vehicle mounting can be improved.

The present invention has been described briefly above. Further, details of the present invention will be clarified further by reading a mode for carrying out the invention (hereinafter, referred to as "embodiment".) described below with reference to attached drawings.

DETAILED DESCRIPTION OF EMBODIMENTS

Specific embodiments according to the present invention are described below with reference to the drawings.

First Embodiment

First, a vehicle power supply circuit 10 of a first embodiment according to the present invention is described with reference to FIG. 1 and FIG. 2.
<Concerning Circuit Configuration of Vehicle Power Supply Circuit>

A circuit configuration of the vehicle power supply circuit 10 of the present embodiment is described with reference to FIG. 1. FIG. 1 is a schematic circuit configuration diagram illustrating the vehicle power supply circuit 10 according to the present embodiment.

The vehicle power supply circuit 10 of the present embodiment is configured as a power supply circuit adaptable to either case in which a transmission of a vehicle is a continuously variable transmission or a manual transmission. The vehicle power supply circuit 10 is mounted on the vehicle in order to turn on the back lamps L1 and L2, as an electrical load to be described later, when the transmission is switched to a back gear.

Figure 1:
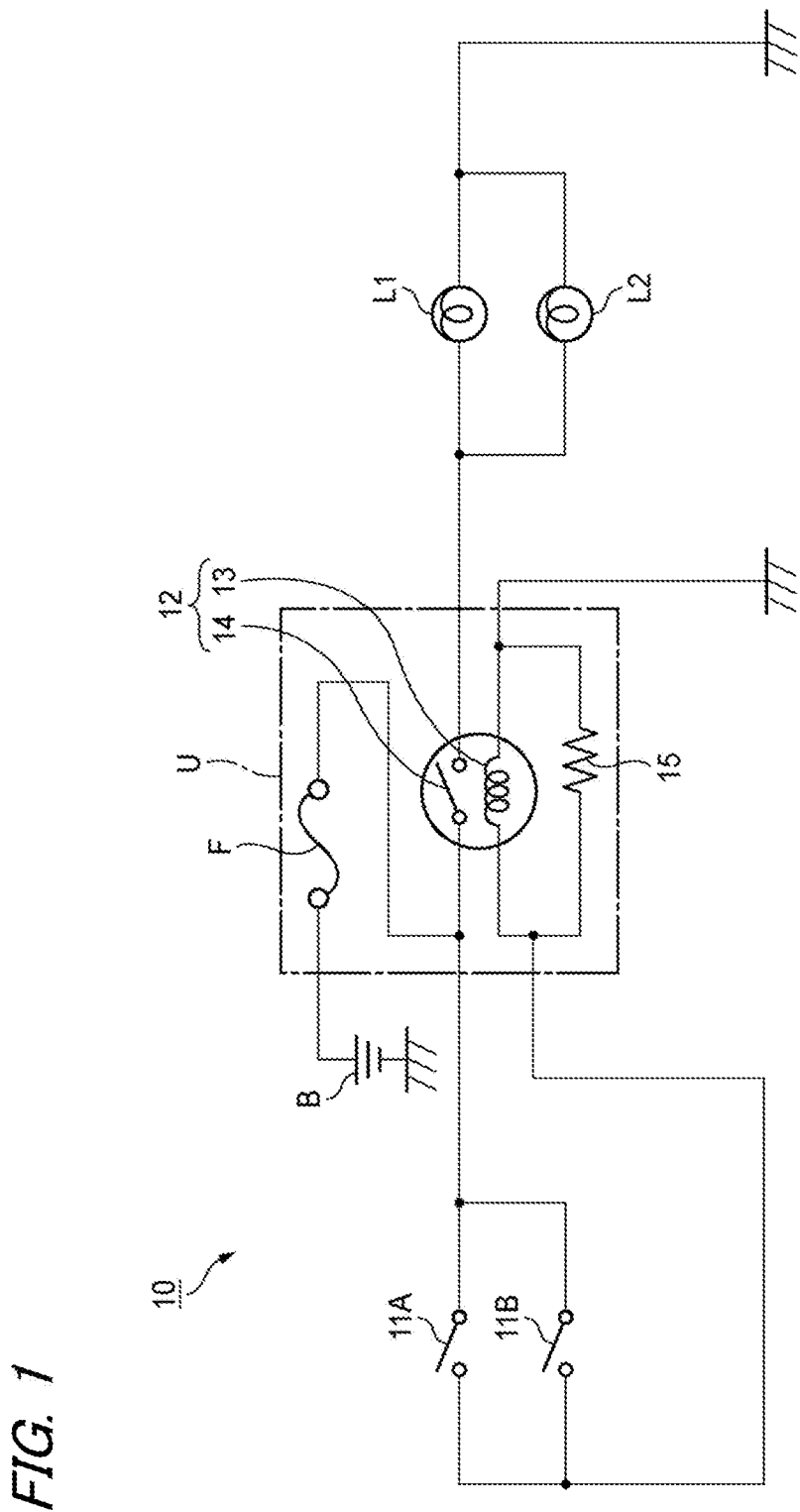
FIG. 1 is a schematic circuit configuration diagram illustrating a vehicle power supply circuit according to a first embodiment of the present invention.

As shown in FIG. 1, the vehicle power supply circuit 10 includes a power supply B provided by grounding, a plurality of (two in the present embodiment) switch circuits 11A and 11B, a relay circuit 12 having an excitation coil 13 and a switch unit 14, back lamps (lamp devices) L1 and L2 supplied with electric power from the power supply B as the electrical load, and a resistor 15.

The vehicle power supply circuit 10 is wired by, for example, extending across the front and back of the vehicle, and constituent elements of the vehicle electric power supply circuit 10 are connected to each other by an electric wire having a predetermined standard and length.

The power supply B is a power supply such as an alternator or a lead battery, and a negative electrode side (the other end) thereof is grounded, and a positive electrode side (one end) thereof is connected to a fuse circuit F that protects the circuit from an overcurrent. The power supply B supplies power to the vehicle power supply circuit 10 via the fuse circuit F. A pair of the back lamps L1 and L2 are provided and connected in parallel to each other. A positive electrode side (one end) of the pair of back lamps L1 and L2 is connected to a negative electrode side (the other end) of the switch unit 14 of the relay circuit 12 to be described later, and a negative electrode side (the other end) of the pair of back lamps L1 and L2 is grounded, and electric power is supplied from the power supply B. The back lamps L1 and L2 are respectively disposed at left and right end portions of a back portion of the vehicle. The back lamps L1 and L2 are turned on when the transmission of the vehicle is switched to the back gear to notify that a host vehicle is in a reversing state with respect to a back of the host vehicle.

In the present embodiment, a voltage value applied to the back lamps L1 and L2 is about 11.7 [V]. Further, although the power supply B is an alternator or a lead battery in the present embodiment, the power supply B is not limited thereto, and various power supplies can be appropriately applied as long as the power supply can supply power. Although examples of the electrical load include the back lamps L1 and L2, the present invention is not limited thereto. Various electrical loads such as a motor can be applied as long as the electrical load requires a voltage of a predetermined value or more. The number of loads is not limited, and a plurality of loads may be connected in series.

The first and second switch circuits 11A and 11B are disposed in, for example, an engine room in front of the vehicle and connected in parallel to each other, the first and second switch circuits 11A and 11B are connected to the power supply B at positive electrode sides (one end) separately and switched to an open or short circuit separately. The first and second switch circuits 11A and 11B have different specifications from each other. That is, the first switch circuit 11A is a circuit for the manual transmission, and a rated value of a current flowing from the power supply B to the switch circuit 11A itself is set. In the case of the present embodiment, the rated value of the current of the first switch circuit 11A is set to 1 [A]. When the current of 1 [A] or more flows to the first switch circuit 11A, an oxide film generated at a contact (not shown) of the first switch circuit 11A is removed. The second switch circuit 11B is a circuit for the continuously variable transmission. In the second switch circuit 11B, the rated value of the current flowing to the switch circuit 11B itself is not set, and the second switch circuit 11B is adaptable to a wide range of current values. Initial states of the first and second switch circuits 11A and 11B are set to open.

In the present embodiment, as described above, the vehicle power supply circuit 10 includes the first and second switch circuits 11A and 11B. Here, when the vehicle power supply circuit 10 is mounted on a vehicle, only the first switch circuit 11A corresponding to the back gear of the manual transmission (specification of the vehicle) is set to be capable of switching to an open or short circuit when the transmission of the vehicle is a manual transmission. At this time, the second switch circuit 11B is set to be open at all times and is mounted so as not to function as the switch circuit 11B. On the other hand, when the transmission of the vehicle is a continuously variable transmission, only the second switch circuit 11B corresponding to the back gear of the continuously variable transmission is set to be capable of switching to an open or short circuit. At this time, similarly, the first switch circuit 11A is mounted so as not to function as the switch circuit 11A.

Since the switch circuits 11A and 11B are generally low-cost components, even though a part of the plurality of switch circuits 11A and 11B is provided so as not to function as described above, an influence on whole manufacturing cost is small.

A positive electrode side (one end) of the excitation coil 13 of the relay circuit 12 is connected to the first and second switch circuits 11A and 11B separately, and a negative electrode side (the other end) thereof is grounded. A positive electrode side (one end) of the switch unit 14 of the relay circuit 12 is connected to the power supply B via the fuse circuit F. The switch unit 14 of the relay circuit 12 is switched from an open circuit to a short circuit since a current flows from the power supply B to the excitation coil 13 of the relay circuit 12 through the first or second switch circuits 11A and 11B.

In the present embodiment, a current of about 0.12 [A] flows to the excitation coil 13 of the relay circuit 12. Further, since the plurality of switch circuits 11A and 11B are installed in the engine room of the vehicle, electric power of the power supply B needs to be guided into the engine room by using an electric wire (conductive wire), and a voltage drop following resistance of the conductor may not supply electric power of more than a prescribed amount to the back lamps L1 and L2. To prevent the voltage drop, the relay circuit 12 is used.

The resistor 15 is disposed in parallel with the excitation coil 13 of the relay circuit 12. That is, a positive electrode side (one end) of the resistor 15 is connected to negative electrode sides of the first and second switch circuits 11A and 11B separately, and a negative electrode side (the other end) of the resistor 15 is grounded. A resistance value of the resistor 15 is set based on the rated value of the first switch circuit 11A.

<Concerning Electric Path at the Time of Energization of Vehicle Power Supply Circuit>

Next, an electric path at the time of energization of the vehicle power supply circuit 10 is described with reference to FIG. 2. FIG. 2 is a schematic circuit configuration diagram showing a state in which the vehicle power supply circuit 10 shown in FIG. 1 is energized.

Figure 2:
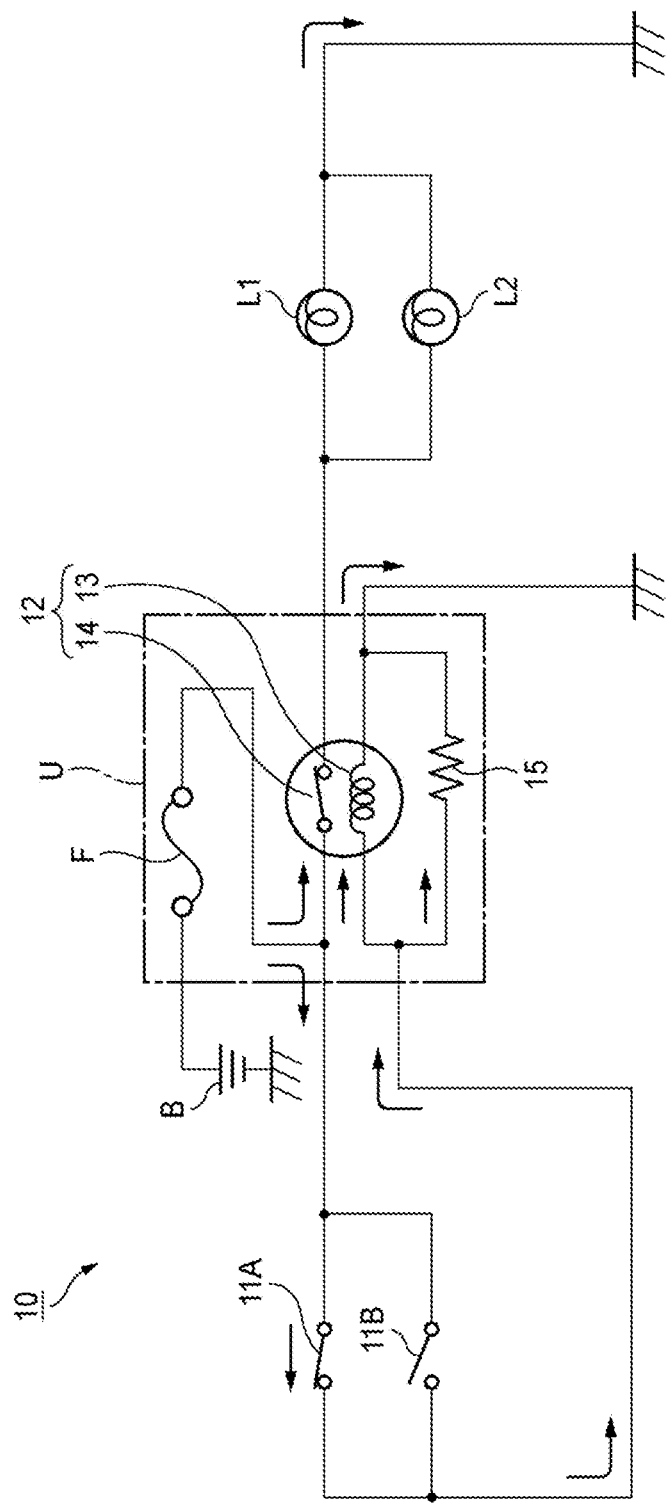
FIG. 2 is a schematic circuit configuration diagram showing a state in which the vehicle power supply circuit shown in FIG. 1 is energized.

An arrow in FIG. 2 indicates a path (flow) of electricity from the power supply B when the vehicle power supply circuit 10 is energized. In description using FIG. 2, when the vehicle power supply circuit 10 of the present embodiment is mounted on a vehicle, only the first switch circuit 11A is set to be capable of switching to an open or short circuit.

As shown in FIG. 2, when the transmission of the vehicle is switched to the back gear, the first switch circuit 11A is switched from an open circuit to a short circuit first. By the switching, the first switch circuit 11A is energized, and a current from the power supply B is shunted before the excitation coil 13 of the relay circuit 12 and the resistor 15. One current flows to the excitation coil 13 of the relay circuit 12, and a magnetic field is generated in the excitation coil 13. According to the generation of the magnetic field, the switch unit 14 of the relay circuit 12 is attracted by magnetic force to be switched from an open circuit to a short circuit. The other current passes through the resistor 15 and flows to the ground. Also, the current passing through the excitation coil 13 of the relay circuit 12 merges with the current passing through the resistor 15 and flows directly to the ground.

Next, when the switch unit 14 of the relay circuit 12 is switched to a short circuit, the switch unit 14 of the relay circuit 12 is energized, and the pair of back lamps L1 and L2 which are the electrical loads are supplied with electric power separately from the power supply B. As a result, electricity flows to the pair of back lamps L1 and L2, and the pair of back lamps L1 and L2 are turned on. Here, the positive electrode side of the resistor 15 is connected to the negative electrode sides of the first and second switch circuits 11A and 11B separately, and the resistance value of the resistor 15 is set based on the rated value of the first switch circuit 11A, so that a current having a desired value flows to the first switch circuit 11A. Accordingly, a current as per a specification (rating) of the first switch circuit 11A flows, and as a result, an oxide film generated at a contact of the first switch circuit 11A can be removed.

Even in the second switch circuit 11B, the current flows from the power supply B similarly, but the second switch circuit 11B is not subject to limitation of the current specification, and is energized as it is.

<Concerning Advantages of Vehicle Power Supply Circuit of First Embodiment>

As described above, according to the vehicle power supply circuit 10 of the present embodiment, the rated value of the current flowing from the power supply B to the switch circuit 11A itself is set in the first switch circuit 11A among the plurality of switch circuits 11A and 11B, and even when specifications are different between the first switch circuit 11A and the second switch circuit 11B, a desired current can flow to the switch circuit 11A in which the rated value is set by using the resistor 15 which is a simple circuit element. Accordingly, even when the specifications of the switch circuits 11A and 11B are different, the circuit can be standardized with a simple configuration and versatility can be enhanced. Therefore, the manufacturing cost of the vehicle power supply circuit 10 can be reduced, and work efficiency at the time of vehicle mounting can be improved.

According to the vehicle power supply circuit 10 of the present embodiment, a resistance value of the resistor 15 is set based on the rated value. Since the resistor 15 having various resistance values can be obtained easily and at low cost, standardization of the circuit can be easily realized, and an increase in manufacturing cost can be prevented.

Further, according to the vehicle power supply circuit 10 of the present embodiment, only one of the plurality of switch circuits 11A and 11B corresponding to the specification of the vehicle is set to be capable of being switched to an open or short circuit, and the rest of the plurality of switch circuits 11A and 11B is set to be open at all times.

Since one of the plurality of switch circuits 11A and 11B is selected according to the specification of the vehicle, it can be applied to various vehicle types, and versatility of the circuit can be enhanced.

According to the vehicle power supply circuit 10 of the present embodiment, a plurality of back lamps (loads) L1 and L2 are provided and connected in parallel to each other. Electric power can be supplied from the power supply B to the pair of back lamps (a plurality of loads) L1 and L2 through the switch circuits 11A and 11B simultaneously.

Second Embodiment

Next, a vehicle power supply circuit 20 of a second embodiment according to the present invention is described with reference to FIG. 3.

<Concerning Circuit Configuration of Vehicle Power Supply Circuit>

A circuit configuration of the vehicle power supply circuit 20 of the present embodiment is described with reference to FIG. 3. FIG. 3 is a schematic circuit configuration diagram illustrating a vehicle power supply circuit 20 according to the present embodiment.

Figure 3:
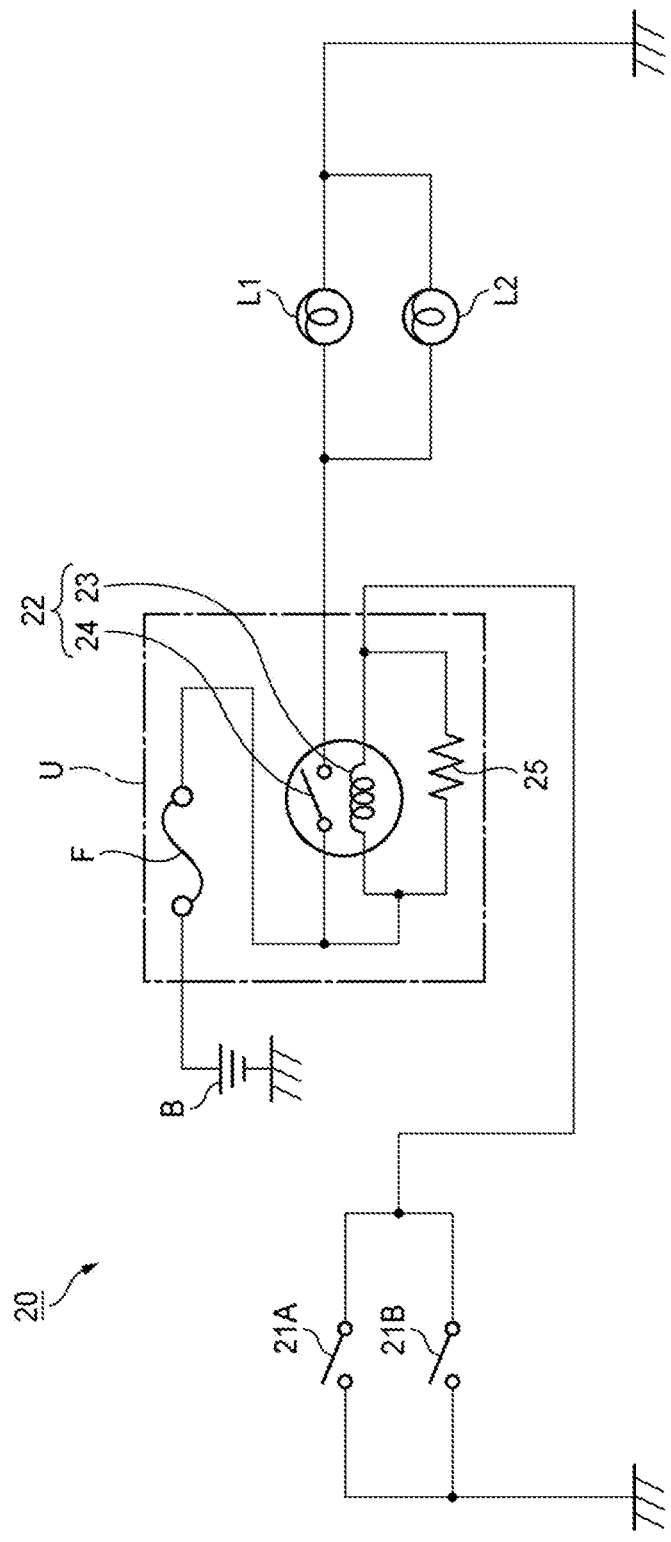
FIG. 3 is a schematic circuit configuration diagram illustrating a vehicle power supply circuit according to a second embodiment of the present invention.
Figure 4:
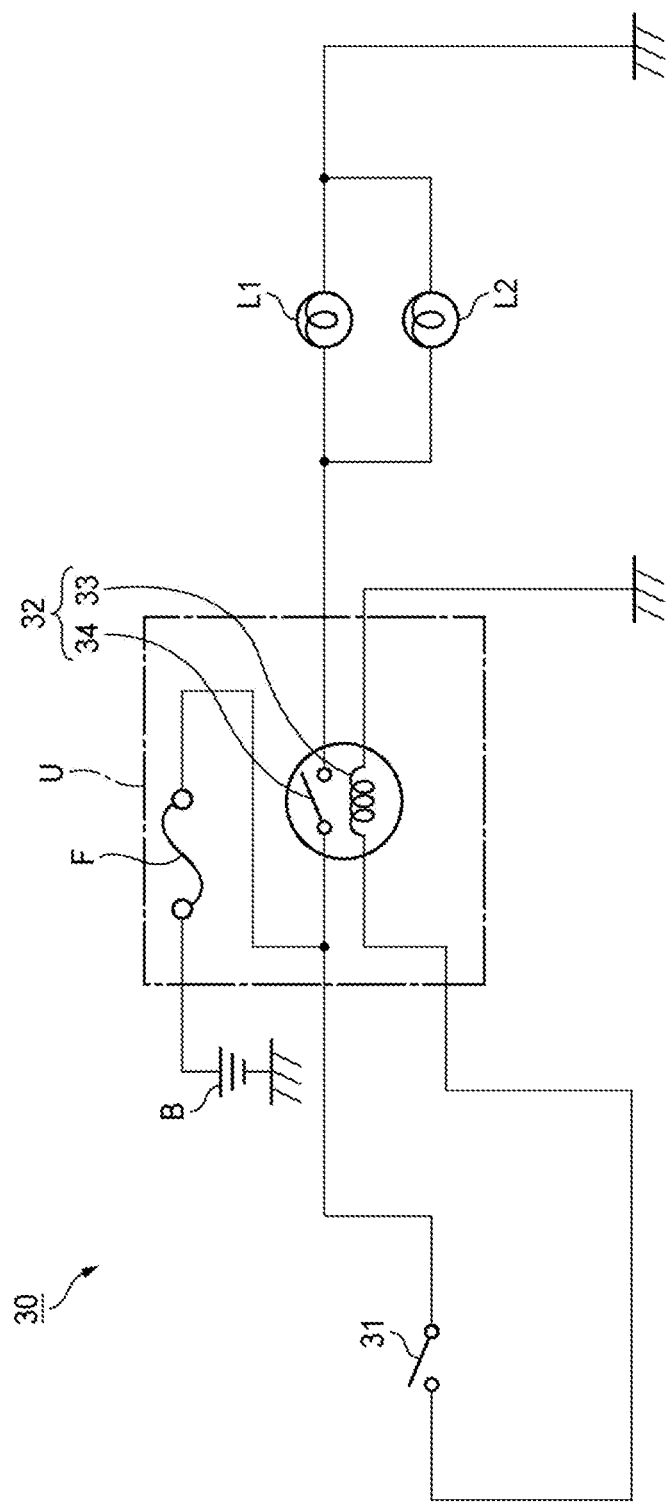
FIG. 4 is a schematic circuit configuration diagram illustrating a vehicle power supply circuit according to a first related example.
Figure 5:
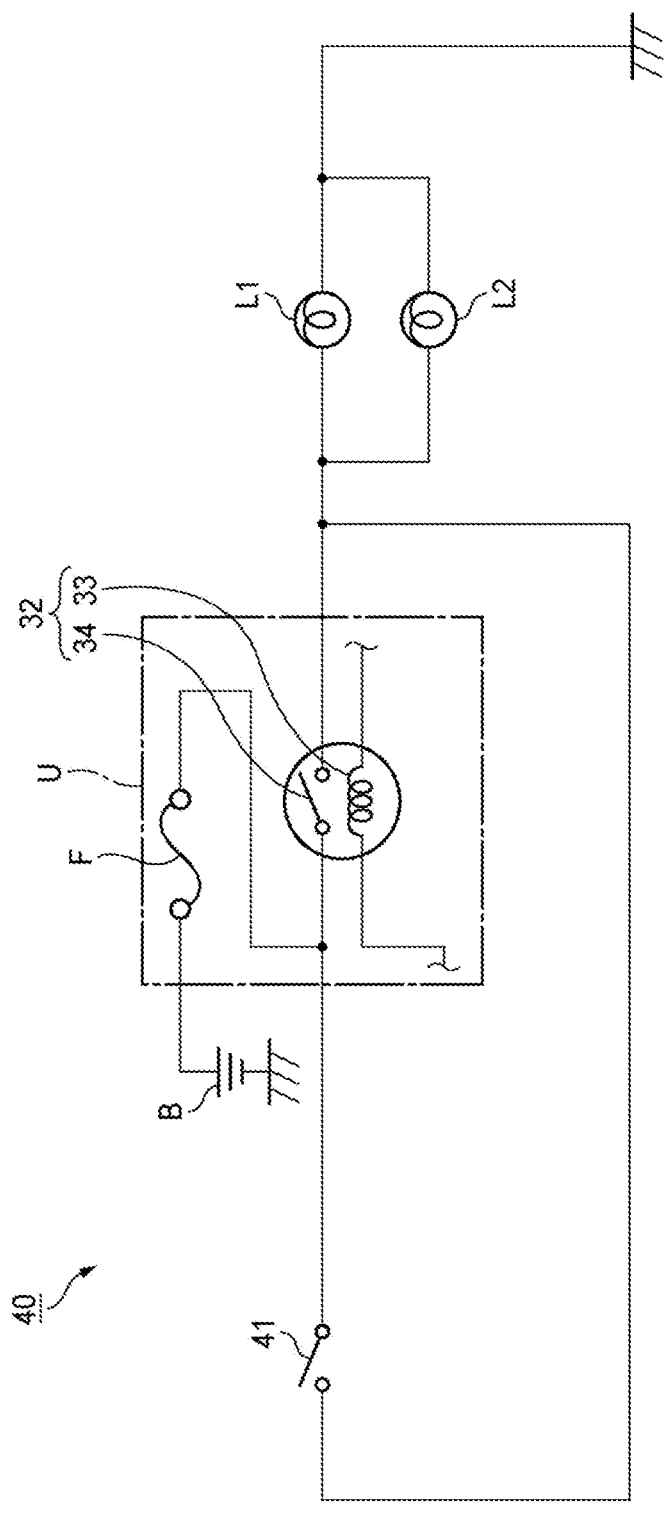
FIG. 5 is a schematic circuit configuration diagram illustrating a vehicle power supply circuit according to a second related example.

As shown in FIG. 3, the vehicle power supply circuit 20 of the present embodiment includes a power supply B, first and second switch circuits 21A and 21B, a relay circuit 22, back lamps (lamp devices) L1 and L2, and a resistor 25.

In the present embodiment, an excitation coil 23 of the relay circuit 22 has a positive electrode side (one end) connected to the power supply B via a fuse circuit F and a negative electrode side (the other end) connected to a positive side (one end) of the first and second switch circuits 21A and 21B. Similarly, the resistor 25 has a positive electrode side (one end) connected to the power supply B and a negative electrode side (the other end) connected to the positive electrode side (one end) of the first and second switch circuits 21A and 21B. Further, the first and second switch circuits 21A and 21B has the positive electrode side (one end) connected to the power supply B via the excitation coil 23 and the resistor 25, and the negative electrode side (the other end) grounded.

With such a configuration, when a transmission of the vehicle is switched to a back gear, the first switch circuit 21A is switched from an open circuit to a short circuit. The first switch circuit 21A is energized by the switching, and a current flows from the power supply B to both the excitation coil 23 of the relay circuit 22 and the resistor 25. Then, a switch unit 24 of the relay circuit 22 is switched from an open circuit to a short circuit by the excitation coil 23 of the relay circuit 22. When the switch unit 24 of the relay circuit 22 is switched to a short circuit, the switch unit 24 of the relay circuit 22 is energized, and a pair of the back lamps L1 and L2 are supplied with electric power from the power supply B separately.

Even in the second switch circuit 21B, the current flows from the power supply B similarly, but the second switch circuit 21B is not subject to limitation of the current specification, and is energized as it is.

<Concerning Advantages of Vehicle Power Supply Circuit of Second Embodiment>

As described above, according to the vehicle power supply circuit 20 of the present embodiment, even when specifications of the switch circuits 21A and 21B are different, the circuit can be standardized, and versatility can be enhanced. Although the plurality of switch circuits 21A and 21B are usually installed in an engine room of the vehicle, electric wires that return from the switch circuits 21A and 21B to the vehicle body can be reduced according to the present embodiment. Accordingly, manufacturing cost of the vehicle power supply circuit 20 can be reduced.

Further, according to the vehicle power supply circuit 20 of the present embodiment, positions of the switch circuits 21A and 21B with respect to the excitation coil 13 of the relay circuit 12 are reversed in upstream and downstream compared with the first embodiment, and surge characteristics are different (the phase is reversed) in electrical change over time. Which of the first or second embodiment should be adopted is selected based on characteristics of loads L1 and L2.

Other operation effects are similar to those of the first embodiment.

The circuit configurations of the vehicle power supply circuits 10 and 20 of the first and second embodiments are not limited to use for a vehicle, and can be widely applied to a power supply circuit used in various fields. Even in this case, the same operation effects as those of the vehicle power supply circuits 10 and 20 described above can be obtained.

Although the description of the specific embodiments is completed above, aspects of the present invention are not limited to these embodiments, and may be appropriately modified, improved, or the like.

Here, characteristics of the vehicle power supply circuit 10 according to the embodiments of the present invention described above will be briefly summarized and listed in the following [1] to [6], respectively.

[1] A vehicle power supply circuit (10, 20) including:
a plurality of switch circuits (11A, 11B, 21A, 21B) which are connected in parallel to each other and connected to a power supply (B) at one end (positive electrode side) to be switched to an open or short circuit separately;
a relay circuit (12, 22) including an excitation coil (13, 23) and a switch unit (14, 24) which is connected to the power supply (B) at one end (positive electrode side) and is switched from an open circuit to a short circuit since a current flows from the power supply (B) to the excitation coil (13, 23);
one or more loads (L1, L2) in which one end (positive electrode side) is connected to the other end (negative electrode side) of the switch unit (14, 24) and the other end (negative electrode side) is grounded, and electric power is supplied from the power supply (B); and
a resistor (15, 25) disposed in parallel with the excitation coil (13, 23) and connected in series to the plurality of switch circuits (11A, 11B, 21A, 21B).

[2] The vehicle power supply circuit (10) according to [1], in which
one end (positive electrode side) of the excitation coil (13) is connected to the other end (negative electrode side) of the plurality of switch circuits (11A, 11B) separately and the other end (negative electrode side) of the excitation coil (13) is grounded, and a current flows from the power supply (B) through the plurality of switch circuits (11A, 11B), and
one end (positive electrode side) of the resistor (15) is connected to the other end (negative electrode side) of the plurality of switch circuits (11A, 11B) separately, and the other end (negative electrode side) of the resistor (15) is grounded.

[3] The vehicle power supply circuit (20) according to [1], in which
one end (positive electrode side) of the excitation coil (23) is connected to the power supply (B), and the other end (negative electrode side) of the excitation coil (23) is connected to one end (positive electrode side) of the plurality of switch circuits (21A, 21B), one end (positive electrode side) of the resistor (25) is connected to the power supply (B), and the other end (negative electrode side) is connected to one end (positive electrode side) of the plurality of switch circuits (21A, 21B), and the one end (positive electrode side) of the plurality of switch circuits (21A, 21B) is connected to the power supply (B) via the excitation coil (23) and the resistor (25), and the other end (negative electrode side) of the plurality of switch circuits (21A, 21B) is grounded.

[4] The vehicle power supply circuit (10, 20) according to [1], in which a rated value of a current flowing from the power supply (B) to the switch circuit is set in at least one of the plurality of switch circuits (11A, 11B, 21A, and 21B), and a resistance value of the resistor (15, 25) is set based on the rated value.

[5] The vehicle power supply circuit (10, 20) according to [1], in which when mounted on a vehicle, only one of the plurality of switch circuits (11A, 11B, 21A, 21B) corresponding to a specification of the vehicle is set to be capable of being switched to an open or short circuit, and the rest of the plurality of switch circuits (11A, 11B, 21A, 21B) is set to be open at all times.

[6] The vehicle power supply circuit (10, 20) according to [1], in which a plurality of the loads (back lamps L1 and L2) are provided and connected in parallel to each other.

What is claimed is:

1. A vehicle power supply circuit comprising:
    a plurality of switch circuits which are connected in parallel to each other and connected to a power supply at one end to be switched to an open or short circuit separately;
    a relay circuit including an excitation coil and a switch unit which is connected to the power supply at one end and is switched from an open circuit to a short circuit since a current flows from the power supply to the excitation coil;
    one or more loads in which one end is connected to the other end of the switch unit and the other end is grounded, and electric power is supplied from the power supply; and
    a resistor disposed in parallel with the excitation coil and connected in series to the plurality of switch circuits.

2. The vehicle power supply circuit according to claim 1, wherein
    one end of the excitation coil is connected to the other end of the plurality of switch circuits separately and the other end of the excitation coil is grounded, and a current flows from the power supply through the plurality of switch circuits, and
    one end of the resistor is connected to the other end of the plurality of switch circuits separately and the other end of the resistor is grounded.

3. The vehicle power supply circuit according to claim 1, wherein
    one end of the excitation coil is connected to the power supply, and the other end of the excitation coil is connected to one end of the plurality of switch circuits,
    one end of the resistor is connected to the power supply, and the other end of the resistor is connected to one end of the plurality of switch circuits, and
    the one end of the plurality of switch circuits is connected to the power supply via the excitation coil and the resistor, and the other end of the plurality of switch circuits is grounded.

4. The vehicle power supply circuit according to claim 1, wherein
    a rated value of a current flowing from the power supply to the switch circuit is set in at least one of the plurality of switch circuits, and
    a resistance value of the resistor is set based on the rated value.

5. The vehicle power supply circuit according to claim 1, wherein
    when mounted on a vehicle, only one of the plurality of switch circuits corresponding to a specification of the vehicle is set to be capable of being switched to an open or short circuit, and the rest of the plurality of switch circuits is set to be open at all times.

6. The vehicle power supply circuit according to claim 1, wherein
    a plurality of the loads are provided and connected in parallel with each other.

* * * * *